United States Patent [19]

Chang

[11] Patent Number: 4,476,187
[45] Date of Patent: Oct. 9, 1984

[54] NON-SINTERED QUARTZ WARE AND METHOD FOR PRODUCING THE SAME

[76] Inventor: Michael Chang, 35, Lane 247, Ken Kou S. Rd., Taipei, Taiwan

[21] Appl. No.: 492,580

[22] Filed: May 9, 1983

Related U.S. Application Data

[63] Continuation-in-part of Ser. No. 321,990, Nov. 16, 1981, abandoned.

[51] Int. Cl.³ .......................... B32B 5/16; C04B 33/04
[52] U.S. Cl. .................................... 428/325; 423/331; 423/336; 501/80; 501/141
[58] Field of Search ................. 501/80, 141; 428/325; 423/331, 336

[56] References Cited

U.S. PATENT DOCUMENTS 3,950,175  4/1976  Lachman et al. ................... 501/80
4,001,028  1/1977  Frost et al. ............................ 501/80

Primary Examiner—Thomas J. Herbert

[57] ABSTRACT

In the method for manufacturing a non-sintered quartz ware the quartz and clay are comminuted and fully mixed to make a batch of raw materials. The batch is then added with an effective amount of ore coagulant of which the composition comprises $2CaO.SiO_2$, $3CaO.SiO_2$ and $3CaO.Al_2O_3$, subsequently, the above components are blended with water and then molded into the desired shape by extrusion pressing. The molded product is then dried under slightly higher than the ambient temperature instead of firing which results in less mechanical strength of the conventional fired ceramic ware.

2 Claims, 1 Drawing Figure

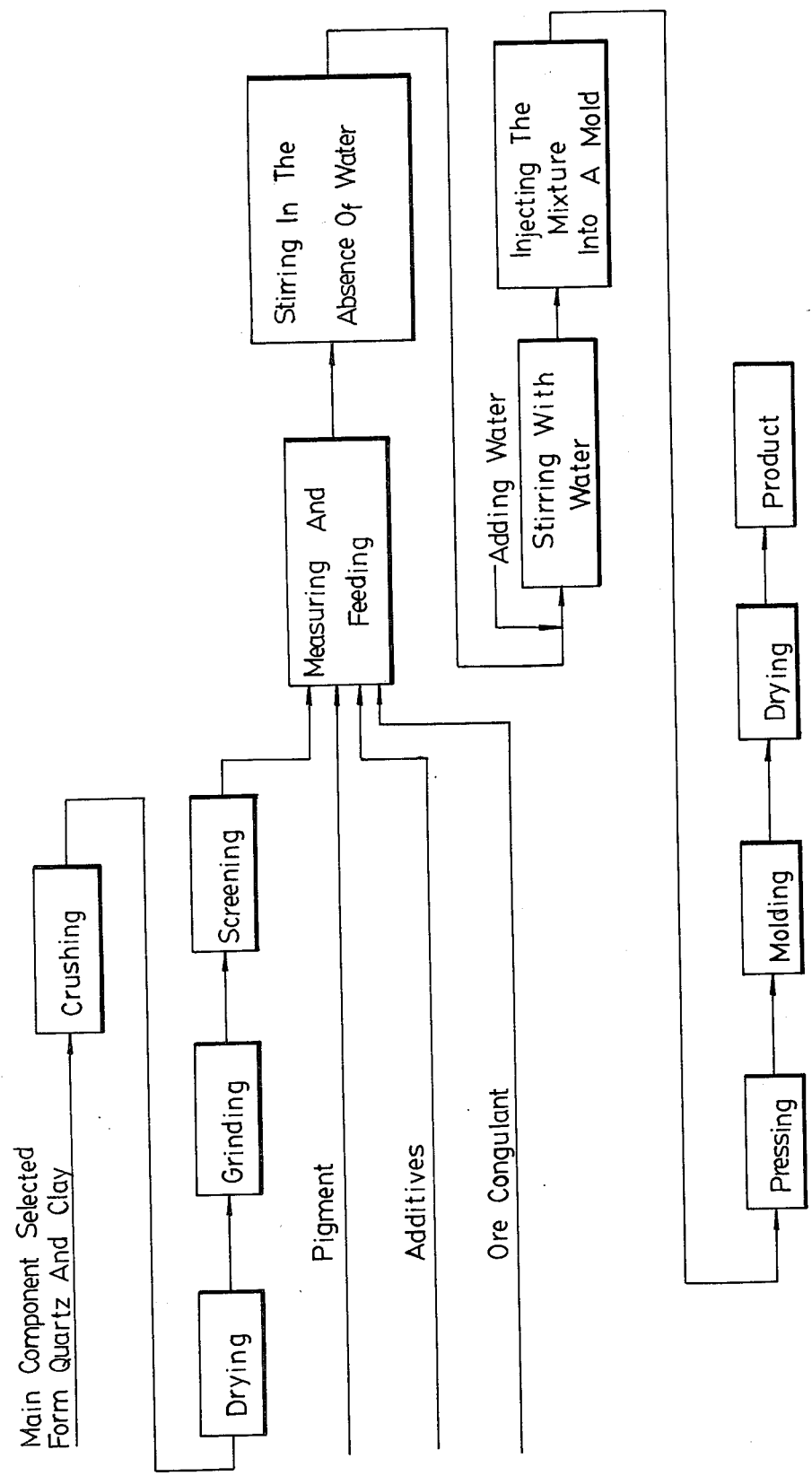

NON-SINTERED QUARTZ WARE AND METHOD FOR PRODUCING THE SAME

CROSS-REFERENCE TO RELATED APPLICATION

This application is a continuation-in-part application of application Ser. No. 321,990 filed on Nov. 16, 1981, now abandoned.

BACKGROUND OF THE INVENTION

The present invention relates to a non-sintered quartz ware and its manufacture.

Conventionally, in the manufacture of ceramic and kilned products, such as brick, tile, pottery vessel, except for the steps of comminuting, admixing and shaping, those have to be further subjected to the high temperature treatment, such as firing and sintering. Such treatment causes disadvantage that not only firing requires rather high technic, but also the procedure is relatively difficult to be controlled, which results in high proportion of defective end products. Apart from it, firing causes the product porous and coarse by burning out some amount of combustible ingredients so that the strength of the product is poor. On the other hand, the coarseness render the quality of the fired product poor and the appearance homely. In order to improve its appearance and quality, a coating enamel has to be applied thereto to make it smoother and glossy. However, glazing is unable to obviate the drawback of poor strength. Thus, a non-sintered ceramic ware without need of fire treatment, and possessing excellent strength and gloss is attempted.

SUMMARY OF THE INVENTION

It is an object of the present invention to provide a ceramic ware without need to be treated with firing.

It is another object of the present invention to provide a ceramic ware having more dense texture and glossy surface.

It is a further object of the present invention to provide a ceramic ware having excellent mechanical strength and suitable for building materials, for example, brick and tile etc.

It is still another object of the present invention to provide a ceramic ware of which manufacture is simplified.

In accordance with the present invention, a non-sintered ceramic ware is made by the process of: formulating a batch of raw materials consisting of powdered quartz and clay; adding an effective amount of an ore coagulant of which the compsition comprises $2CaO.SiO_2$, $3CaO.SiO_2$ and $3CaO.Al_2O_3$; blending the above components with an effective amount of water, and forming the blended material in a suitable mold; and pressuring and low-temperature heating to dry up the formed mass.

In accordance with one aspect of the present invention, the clay is in an amount of 30 parts to 100 parts by volume of 100 parts of the powdered quartz.

In accordance with another aspect of the present invention, the ore coagulant further comprises $4CaO.Al_2O_3.Fe_2O_3$ and $MgO$.

In accordance with further aspect of the present invention, the ore coagulant is in an amount of 20 parts to 50 parts by volume of 100 parts of the clay and the powdered quartz.

The presently preferred exemplary embodiment will be described in detail with respect to the following drawings.

BRIEF DESCRIPTION OF THE DRAWINGS

FIG. 1 is a block diagram illustrating the manufacturing procedure of the non-sintered quartz ceramic ware.

DETAILED DESCRIPTION OF THE PREFERRED EMBODIMENT

Referring now to the flow chart in FIG. 1, the main raw materials adopted in the present invention are powdered quartz, clay and a coagulant composition. The powdered quartz is obtained from the common quartz mineral and the clay can be obtained from kaolinite, montmorillonite or illite. The coagulant can be obtained from an ore coagulant. In addition, pigments and other additives can be added according to the desired quality and colorness.

In the first place, the quartz and clay minerals are separately comminuted and ground. After subjecting to drying to contain less than 4% of water content by volume, they are screened to have the size of more than 40 meshes. Subsequently, the powdered quartz and clay are blended with a coagulant, pigments and other additives until thoroughly mixed. Wherever needed, a proper amount of water is added to make a paste like batch. The batch is molded in different shape by pressing, such as extrusion pressing. The molded product is then dried under the ambient temperature.

The ore coagulant used here is a cementing composition including $2CaO.SiO_2$, $3CaO.SiO_2$ and $3CaO.Al_2O_3$, together with optionally $4CaO.Al_2O_3.Fe_2O_3$, $MgO$ and other retardants. In the presence of the retardant $CaSO_4.2H_2O$, the coagulant $3CaO.Al_2O_3$ exhibits excellent function of coagulation which effectively bindes the powdered quartz and clay together. In the other aspect the usage of $2CaO.SiO_2$ and $3CaO.SiO_2$ will highly enhance the mechanical strength of the resulted product. When the above ore coagulant is applied for cementing, suitable amount of water has to be added to make the blended raw material become a paste-like batch for the subsequent steps of pressing and shaping. Concurrently, $3CaO.SiO_2$ will hydrolyze to become calcium hydroxide and amorphous $2CaO.SiO_2$ (x-1) $H_2O$, which incorporating with the clay will sediment to the contacting surface of the molded product with the mold to form a adhesive layer. Therefore, it has to be cautious that the blended materials assuredly overly filled the mold and intimately contacting inner surface of the mold. It can be noted the smoothness and gloss of the molded product will be dictated by the inner surface of the mold.

The powdered quartz is a crystalline polymorph of silica, and has an excellent hardness. When it is blended with the clay and coagulant, the blended batch is naturally formed into a product of excellent mechanical strength. If the shaped product is subjected to firing, the crystal lattice of the quartz will process a polymorphic transformation which will expand the volume so as to deform and crack the product.

It can be noted that the high plasticity of the clay makes the blend easy to be shaped. Yet it will also contribute to the smoothness and fine texture of the end product. Particularly in case kaolinite $Al_2O_3.2SiO_2.2H_2O$ is used, its high content of silicon dioxide will manifest the excellent binding force and mechanical strength among clay, kaolinite and ore coagulant.

It can be realized that the proportion of powdered quartz to the clay is varied depending on the desired quality. The proportional ratio of powdered quartz to clay can be ranging from 3:1 to 1:1 by volume. When the volume content of the powdered quartz is higher, the resultant product will be harder, so that more amount of coagulant is needed. The ore coagulant may generally be in an amount of 20 parts to 50 parts by volume of 100 parts of clay and powdered quartz. The proportional ratio of the total amount of powdered quartz and clay to the ore coagulant is preferably from about 4.2-1 to 2.3-1 by volume. When the amount of powdered quartz by volume is equal to that of the clay, the ore coagulant is added in an amount ranging from 25 parts to 4 parts by volume of 100 parts of the total amount of the powdered quartz and clay. Certainly further adding amount of other additives will change the needed amount of ore coagulant.

While the invention has been described in connection with what is presently considered to be the most practical and preferred embodiments, it is to be understood that the invention is not to be limited to the disclosed embodiments but on the contrary, is intended to cover various modifications and equivalent arrangements. For example, waterproof agent, heat insulating agent can be added to achieve the desired properties. Further, iron net and glass fiber can be imbedded therein to reinforce the quartz ware. These are undoubtedly included within the spirit and scope of the appended claims which scope is to be accorded the broadest interpretation so as to encompass all such modifications and equivalent structures.

What I claim is:

1. A non-sintered ceramic ware which is made by the process of: formulating a batch of raw materials consisting of powdered quartz and clay; adding an effective amount of ore coagulant of which the composition comprises $2CaO.SiO_2$, $3CaO.SiO_2$, $3CaO.Al_2O_3$, $4CaO.Al_2O_3.Fe_2O_3$ and $MgO$; blending the above components with an effective amount of water, and forming the blended material in a suitable mold; and pressing and drying the formed mass under low temperature heat.

2. A non-sintered ceramic ware which is made by the process of: formulating a batch of raw materials consisting of powdered quartz and clay; adding an ore coagulant in an amount of 20 parts to 50 parts by volume to 100 parts of said clay and powdered quartz, the composition of said ore coagulant comprising $2CaO.SiO_2$, $3CaO.SiO_2$ and $3CaO.Al_2O_3$; blending the above components with an effective amount of water, and forming the blended material in a suitable mold; and pressing and drying the formed mass under low temperature heat.

* * * * *